Oct. 11, 1932.  F. A. BRAUN  1,882,380

BEETLE TRAP

Original Filed Sept. 4, 1928

Inventor
Frederick A. Braun
By Knight Bros
Attorney

Patented Oct. 11, 1932

1,882,380

UNITED STATES PATENT OFFICE

FREDRICK A. BRAUN, OF JENKINTOWN, PENNSYLVANIA, ASSIGNOR TO FRANK SHARP, OF GLENSIDE, PENNSYLVANIA

BEETLE TRAP

Application filed September 4, 1928, Serial No. 303,756. Renewed May 11, 1932.

This invention relates to improvements in traps for catching beetles and the like in which a bait-containing compartment is located at the entrance of the trap in such a way that the insect or beetle is lured into the trap but never comes upon the bait.

The object of my improvement is to provide a trap which is characterized by great economy of operation. This result I obtain by arranging a bait compartment at the entrance of the trap from which the insects are excluded.

Figure 1:
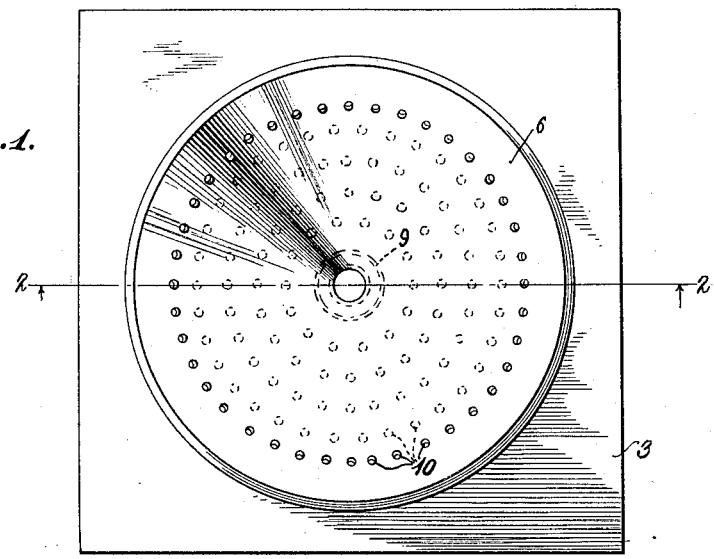
Figure 2:
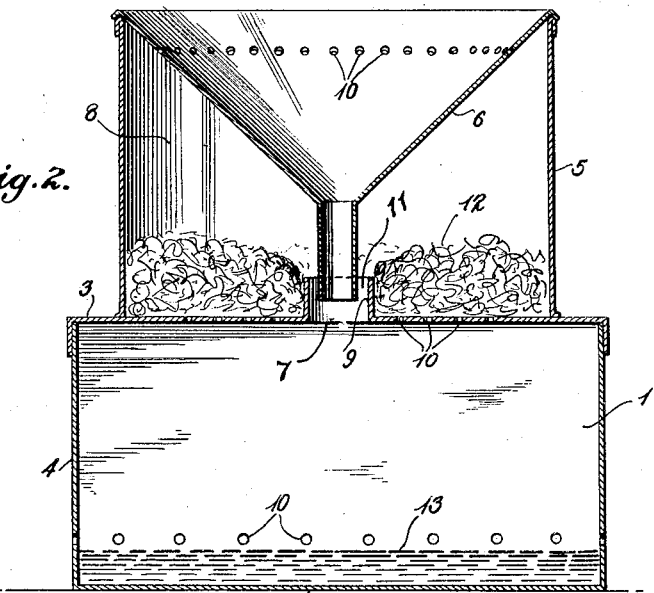

In the accompanying drawing, illustrating the preferred embodiment of my invention, Fig. 1 is a plan view of the device, and Fig. 2 is a sectional view taken along line 2—2 of Fig. 1.

Coming now to a description of my invention, 1 represents in general a receptacle into which the beetles are lured and from which they cannot escape. The receptacle has a bottom 2, a top 3 and an enclosing wall 4. Top 3 in this embodiment is in the form of a detachable lid upon which is mounted a casing 5. The latter supports a hopper 6 having its lower end opening opposite an aperture 7 in top 3. A compartment 8 is thereby formed by casing 5, top 3, and hopper 6. A sleeve 9 is mounted on top 3 and surrounds aperture 7 and the lower end of hopper 6. Perforations 10 are provided in wall 4, in top 3 within the compartment, and in the hopper. These perforations together with the passageway 11 formed between the sleeve 9 and the lower end of hopper 6 permit a draft to pass through the bait compartment into the hopper 6.

A piece of waste 12 is placed in compartment 8 and is saturated with oil of sassafras or the like which readily entices the beetle into the trap. In the bottom of receptacle 1, I place lubricating oil 13 or some other suitable substance to kill the beetles.

The operation of this device will now be understood. The beetles are attracted to the hopper by the odors issuing from the bait compartment into the hopper. From the hopper they proceed into the receptacle from which they cannot escape. The bait remains undiminished for the beetles are completely excluded from the bait compartment.

I wish it understood that my invention is not limited to any specific construction or arrangement of the parts except in so far as such limitations are specified in the appended claims.

Having thus described my invention, what I claim is:

1. An apparatus of the kind described comprising a receptacle consisting of a top, a bottom and an enclosing wall, said top having an aperture therein, a compartment for retaining bait mounted above said top and surrounding said aperture, and a hopper supported on said compartment and leading through said compartment and said aperture into said receptacle, perforations being provided in the wall of said receptacle, in the top of said receptacle within said compartment, and in the hopper, whereby a draft will pass through said receptacle, compartment and hopper.

2. An apparatus of the kind described comprising a receptacle consisting of a top, a bottom and an enclosing wall, said top having an aperture therein, a bait compartment mounted on and above said top and surrounding said aperture, a conical shaped hopper extending downwardly through said compartment and having an extension opening at its lower end and opposite and above said aperture, and a sleeve on said top spacedly surrounding the lower end of the extension of said hopper so as to leave an annular ventilating opening between said sleeve and said extension on the hopper.

The foregoing specification signed at Philadelphia, Pennsylvania, this 29 day of August, 1928.

FREDRICK A. BRAUN.